(12) United States Patent
Murthy et al.

(10) Patent No.: US 10,659,341 B2
(45) Date of Patent: May 19, 2020

(54) SYSTEM FOR DYNAMIC ELECTION OF ROUTE REFLECTORS

(71) Applicant: PayPal, Inc., San Jose, CA (US)

(72) Inventors: Sharad Murthy, San Ramon, CA (US); Mihail Krastev, Menlo Park, CA (US)

(73) Assignee: PAYPAL, INC., San Jose, CA (US)

( * ) Notice: Subject to any disclaimer, the term of this patent is extended or adjusted under 35 U.S.C. 154(b) by 119 days.

(21) Appl. No.: 16/022,268

(22) Filed: Jun. 28, 2018

(65) Prior Publication Data
US 2020/0007429 A1 Jan. 2, 2020

(51) Int. Cl.
H04L 12/751 (2013.01)
H04L 29/08 (2006.01)

(52) U.S. Cl.
CPC .......... H04L 45/02 (2013.01); H04L 67/1051 (2013.01); H04L 67/1068 (2013.01); H04L 67/1089 (2013.01)

(58) Field of Classification Search
None
See application file for complete search history.

(56) References Cited

U.S. PATENT DOCUMENTS

| | | | | |
|---|---|---|---|---|
| 9,817,703 B1 * | 11/2017 | Ryland | ...................... | G06F 9/52 |
| 2006/0083215 A1 | 4/2006 | Uttaro | | |
| 2006/0253856 A1 * | 11/2006 | Hu | .......................... | G06F 9/526 718/104 |
| 2007/0097974 A1 | 5/2007 | Ward | | |
| 2009/0164835 A1 * | 6/2009 | Uttaro | ................. | H04L 41/0668 714/4.1 |
| 2010/0023521 A1 * | 1/2010 | Arcese | ................ | G06F 16/2343 707/E17.007 |
| 2010/0220736 A1 * | 9/2010 | Mohapatra | .............. | H04L 45/04 370/401 |
| 2012/0213218 A1 * | 8/2012 | Yilmaz | ................... | H04L 45/02 370/351 |
| 2015/0117178 A1 * | 4/2015 | Kotalwar | ................ | H04L 45/28 370/219 |
| 2015/0379009 A1 * | 12/2015 | Reddy | ................. | G06F 16/2255 707/747 |
| 2018/0336054 A1 * | 11/2018 | Sura | ....................... | G06F 9/4887 |

* cited by examiner

Primary Examiner — Otis L Thompson, Jr.
(74) Attorney, Agent, or Firm — Haynes and Boone, LLP

(57) ABSTRACT

A first route reflector client manager determines identifies that a distributed lock has been released, wherein the first route reflector client manager corresponds to a first route reflector client. In response to the determining that the distributed lock has been released, the first route reflector client manager retrieves the distributed lock. In response to retrieving the distributed lock the first route reflector client manager provisions the first route reflector client into a first route reflector. The first route reflector client manager advertises information corresponding to the provisioning of the first route reflector client into the first route reflector, wherein the advertising causes at least a second route reflector client to identify the first route reflector client as the first route reflector.

20 Claims, 7 Drawing Sheets

SYSTEM FOR DYNAMIC ELECTION OF ROUTE REFLECTORS

TECHNICAL FIELD

The present disclosure relates to route reflectors, and more particularly to the dynamic election of route reflectors.

BACKGROUND

Border Gateway Protocol (BGP) is a routing protocol that is widely used all over the world. Particularly, BGP is a standardized exterior gateway protocol designed to exchange routing and reachability information among autonomous systems on the Internet. Typically, BGP makes routing decisions based on paths, network policies, or rulesets configured by a network administrator.

A route reflector is a network routing component that acts as a focal point for a BGP network. In other words, the utilization of a route reflector allows BGP routers to peer with a central point (a route reflector) rather than peering with each BGP router in the BGP mesh. However, due to route reflectors being central points in BGP networks, a route reflector represents a single point of a failure, which may lead to issues. Therefore, if a route reflector fails, forwarding is lost to all containers whose routes are advertised through the route reflector until another route reflector is provisioned, and all relevant BGP routers are re-provisioned to peer with the new route reflector. A solution to this issue can help prevent these forwarding losses.

DETAILED DESCRIPTION

Embodiments of the present disclosure provide a system, method, and program product. A first route reflector client manager determines identifies that a distributed lock has been released, wherein the first route reflector client manager corresponds to a first route reflector client. In response to the determining that the distributed lock has been released, the first route reflector client manager retrieves the distributed lock. In response to retrieving the distributed lock the first route reflector client manager provisions the first route reflector client into a first route reflector. The first route reflector client manager advertises information corresponding to the provisioning of the first route reflector client into the first route reflector, wherein the advertising causes at least a second route reflector client to identify the first route reflector client as the first route reflector.

In the example embodiment, the present disclosure describes a solution to the problem of forwarding loss that may occur when a route reflector fails or becomes unavailable (for example due to a power outage). In the example embodiment, the present disclosure describes a system that enables an automatic election of a route reflector from a network of route reflector clients, in order to minimize forwarding loss when a provisioned route reflector fails. In the example embodiment, the present disclosure describes a solution that includes a route reflector client manager identifying that a lock has been released by a server(s), such as Consul® (Consul is a registered trademark of HashiCorp.), configured to serve as a distributed key value store for distributed locks and IP addresses corresponding to route reflectors. In the example embodiment, the present disclosure further describes the route reflector client manager retrieving the released lock, and, in response to the retrieval of the lock, the route reflector client manager provisioning the route reflector client into a route reflector. Furthermore, the present disclosure describes the route reflector client manager advertising the re-provisioning to the other route reflector clients in the subnet. The present disclosure is described in further detail below.

Embodiments of the present disclosure will now be described in detail with reference to the accompanying Figures.

Figure 1:
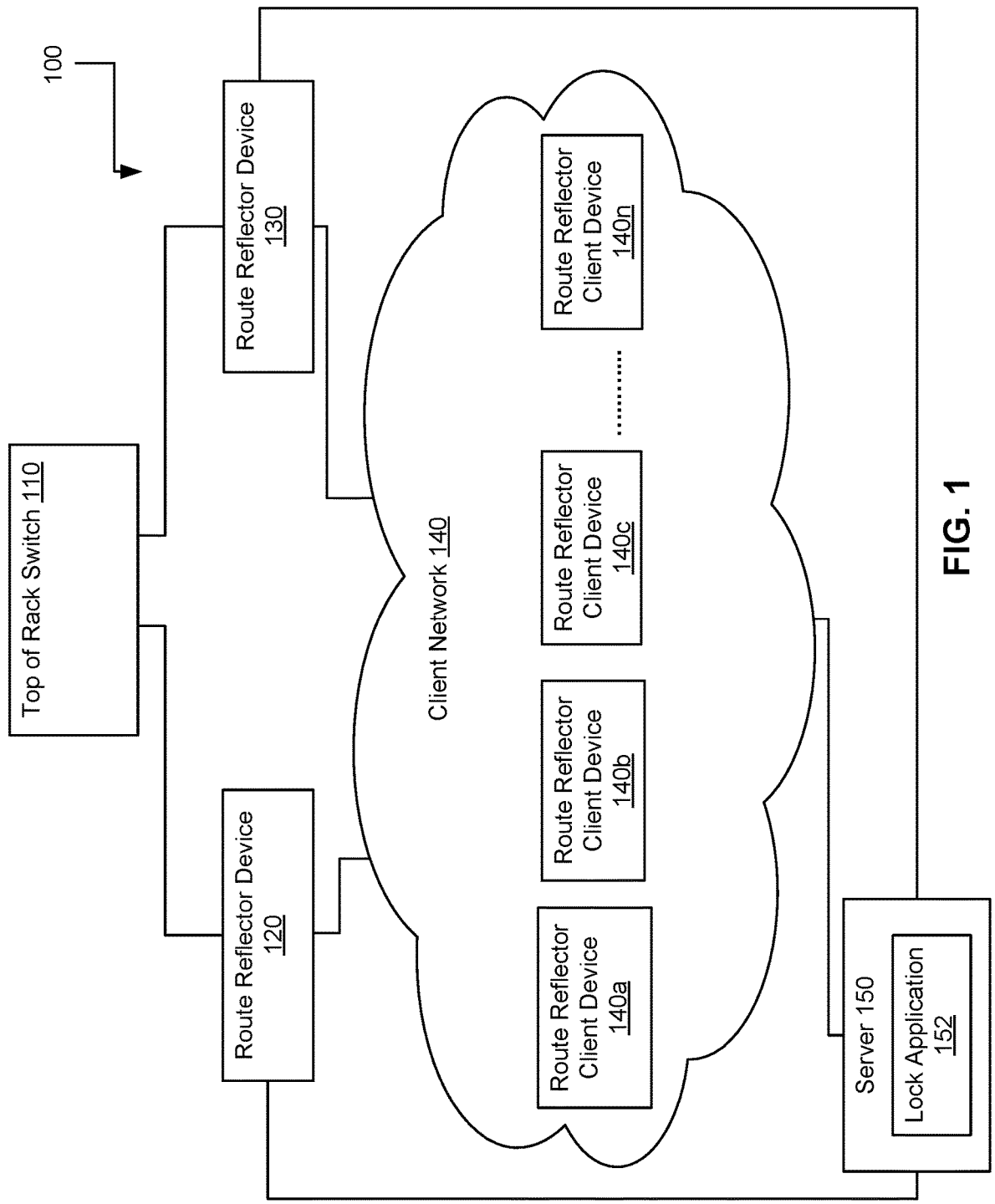
FIG. 1 illustrates an autonomous system, in accordance with an embodiment.

FIG. 1 illustrates autonomous system 100, in accordance with an embodiment. In the example embodiment, autonomous system 100 includes top of rack switch 110, route reflector device 120, route reflector device 130, client network 140, and server 150.

In the example embodiment, the devices in autonomous system 100 may communicate via a network connection. The network connection may be, for example, a wired, a wireless or a fiber optic connection. In other embodiments, the network connection may be implemented as an intranet, a Bluetooth network, a local area network (LAN), or a wide area network (WAN). In general, the network connection may be any combination of connections and protocols that will support communications between computing devices, such as between route reflector device 120 and client network 140.

In the example embodiment, top of rack switch 110 is a computing device that is capable of handling operations, such as Layer 2 and Layer 3 frame packet forwarding, for a rack of connected servers. Furthermore, top of rack switch 110 may include a BGP application that is a software application that is capable of transmitting information to route reflector device 120 and/or route reflector device 130 for the purpose of forwarding to one or more connected route reflector client devices. Top of rack switch 110 is described in more detail with regard to figures.

In the example embodiment, route reflector device 120 and route reflector device 130 are network routing devices for a BGP network. In the example embodiment, route reflector device 120 and route reflector device 130 may serve as route reflector devices to one or more route reflector client devices (such as the route reflector client devices in client network 140) and may additionally serve as route reflector client devices. Therefore, in the example embodiment, route reflector device 120 and route reflector device 130 have one or more components that create the capabilities for routing information to one or more route reflector client devices in client network 140 (discussed further with regard to FIG. 2). Route reflector device 120 and route reflector device 130 are described in more detail with regard to the figures.

Client network 140 includes a plurality of route reflector client devices (route reflector client devices 140 a through 140n). In the example embodiment each route reflector client device in client network 140 are in communication with route reflector device 120 and route reflector device 130. In addition, if a route reflector device goes down, each route reflector client device in client network 140 may be capable of becoming a route reflector device. Client network 140 and the route reflectors client devices that make up client network 140 are described in more detail with regard to the figures.

Server 150 includes lock application 152. In the example embodiment, server 150 is a computing device or computing system capable of receiving and sending data to and from other computing devices, such as route reflector client device 140a, via a network connection. Furthermore, in the example embodiment, server 150 is a computing device, such as Consul, that is configured to provide a distributed key value store for autonomous system 100. This may include storing one or more distributed locks and further storing one or more corresponding context key values. Furthermore, lock application 152 is an application on server 150 that may be capable of detecting for the reception of updates corresponding to one or more context key values from one or more route reflector devices in autonomous system 100 (route reflector device 120 and route reflector device 130), and based on not receiving an update from the one or more route reflectors devices for a threshold period of time, capable of releasing a distributed lock. Although not shown, optionally, server 150 can comprise a cluster of servers executing the same software to collectively process requests as distributed by a front-end server and a load balancer. Server 150 is described in more detail with regard to figures.

In addition, in the example embodiment, the number of route reflectors that serve a subnet (autonomous system 100) is equal to the number of logical contexts created by an administrator for a subnet. In addition, the number of distributed locks and corresponding context keys is also equal to the number of logical contexts created by the administrator of the subnet. Therefore, for autonomous system 100, where an administrator has created two logical contexts, two route reflectors have been provisioned (a route reflector on route reflector device 120 and a route reflector on route reflector device 130). Furthermore, two distributed locks are created and two corresponding key values are created and stored in server 150.

Furthermore, in one or more embodiments, autonomous system 100 may include a second top of rack switch in communication with route reflector device 120 and route reflector device 130 (or at least one of route reflector device 120 and route reflector device 130).

Figure 2:
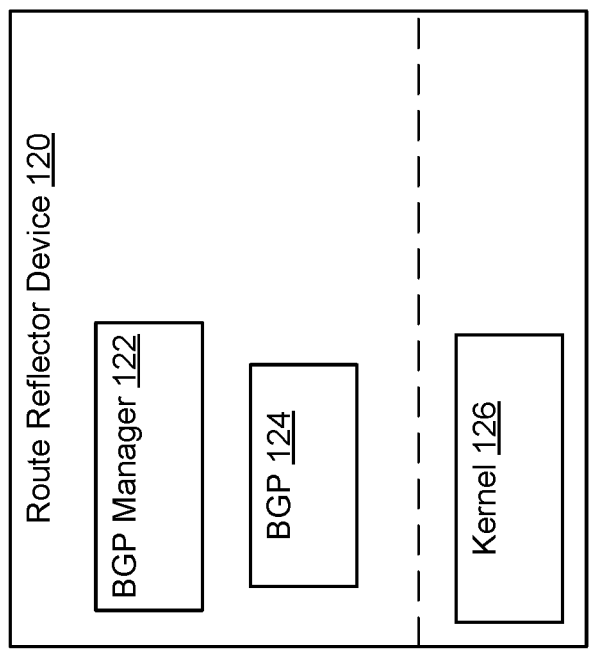
FIG. 2 is an illustration of the components of the route reflectors of FIG. 1, in accordance with an embodiment.

FIG. 2 is an illustration of the components of route reflector device 120, in accordance with an embodiment. In the example embodiment, route reflector device 120 includes BGP manager 122, BGP 124, and kernel 126. In the example embodiment, kernel 126 is capable of managing the operations of route reflector device 120, such as the memory and CPU time associated with route reflector device 120. Furthermore, in the example embodiment, kernel 126 includes a routing table that contains one or more routes corresponding to one or more containers deployed on route reflector device 120. In the example embodiment, BGP 124 is a BGP application, located on route reflector device 120, that serves as a route reflector for client network 140. In the example embodiment, BGP 124 is further capable of peering with the BGP application located on top of rack switch 110. Furthermore, in the example embodiment, BGP 124 is capable of peering with BGP applications located on each route reflector client device in client network 140.

In the example embodiment, BGP manager 122 is a software application that is capable of managing and provisioning BGP 124. In the example embodiment, BGP manager 122 is a manager that corresponds to (manages) a route reflector (BGP 124). In the example embodiment, BGP manager 122 is further capable of discovering the BGP application located on top of the rack switch 110 and instructing BGP 124 to peer with the BGP application located on top of the rack switch 110. BGP manager 122 is also capable of advertising to the other BGP managers located on the route reflector client devices of client network 140, that BGP 124 has been provisioned to be a route reflector. Furthermore, BGP manager 122 is capable of transmitting periodic context key updates to server 150 to inform server 150 of the status of BGP 124. In addition, in the example embodiment, BGP manager 122 is capable of monitoring server 150 (putting a watch on server 150) to identify when a distributed lock is released. In addition, upon release of a distributed lock by server 150, BGP manager 122 is capable of obtaining the distributed lock, and if the lock is successfully obtained, BGP manager 122 is capable of identifying whether BGP 124 is already a route reflector for another context, and if so, is capable of instructing BGP 124 to step down as a route reflector for all but one context.

In addition, BGP manager 122 is capable of monitoring kernel 126 for changes to the kernel routing table, and upon identifying a change to the kernel routing table, BGP manager 122 may transmit information corresponding to the changes (updated routing table) upstream to top of rack switch 110. Furthermore, BGP manager 122 may receive information, from one or more route reflector client devices, that describes one or more changes (updates) to one or more routing tables for the one or more route reflector client devices. In such instances, BGP manager 122 may upon reception of the information, forward the received information upstream to top of rack switch 110.

Furthermore, in the example embodiment, route reflector device 130 may have the same components (with the same capabilities) as described in the discussion of FIG. 2.

Figure 3:
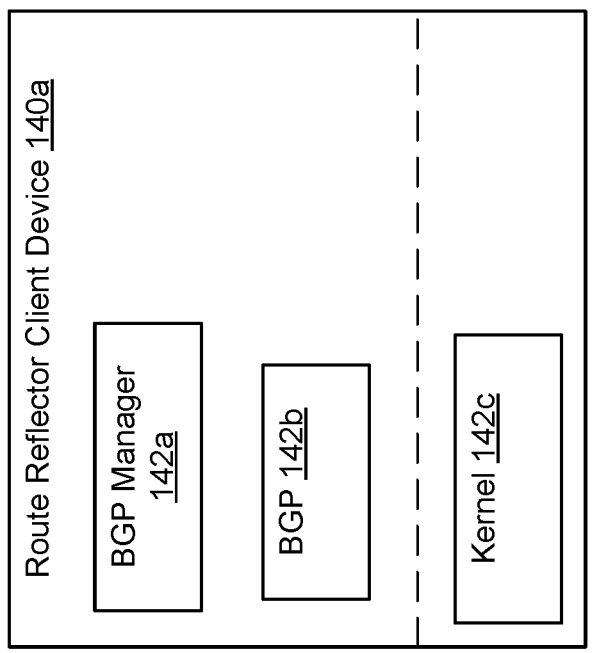
FIG. 3 is an illustration of the components of the route reflector clients of FIG. 1, in accordance with an embodiment.

FIG. 3 is an illustration of the components of the route reflector client device 140a, in accordance with an embodiment. In the example embodiment, route reflector client device 140a includes BGP manager 142a, BGP 142b, and kernel 142c. In the example embodiment, kernel 142c is capable of managing the operations of route reflector client device 140a, such as the memory and CPU time associated with route reflector client device 140a. Furthermore, in the example embodiment, kernel 142c includes a routing table that contains one or more routes corresponding to one or more containers deployed on route reflector client device 140a. In the example embodiment, BGP 142b is a BGP application, located on route reflector client device 140a, that serves as a route reflector client and capable of peering with one or more route reflectors (such as BGP 124) in autonomous system 100.

In the example embodiment, BGP manager 142a is a software application that is capable of managing and provisioning BGP 142*b*. In the example embodiment, BGP manager 142*a* is a manager that corresponds to a route reflector client (BGP 142*b*). In addition, in the example embodiment, BGP manager 142*a* is capable of monitoring server 150 (placing a watch on server 150) to identify when a distributed lock is released. In addition, upon release of a distributed lock by server 150, BGP manager 142*a* is capable of obtaining the distributed lock, and if the distributed lock is successfully obtained, BGP manager 142*a* is capable of provisioning BGP 142*b* to be a route reflector for the logical context that corresponds to the obtained distributed lock. BGP manager 142*a* is also capable of advertising to the other BGP managers located on the route reflector client devices of client network 140, that BGP 142*b* has been provisioned to be a route reflector. Furthermore, BGP manager 142*a* is capable of transmitting periodic context key updates to server 150 to inform server 150 of the status of BGP 142*b*. Furthermore, in the example embodiment, if BGP 142*b* is provisioned to be a route reflector, BGP manager 142*a* is further capable of discovering the BGP application located on top of the rack switch 110 and instructing BGP 142*b* to peer with the BGP application located on top of the rack switch 110.

In addition, BGP manager 142*a* is capable of monitoring kernel 142*c* for changes to the kernel routing table, and upon identifying a change to the kernel routing table, BGP manager 142*a* may transmit information corresponding to the changes (updated routing table) upstream to a corresponding route reflector device (such as route reflector device 120), which may then be forwarded upstream by the corresponding route reflector device to top of rack switch 110.

Furthermore, in the example embodiment, route reflector client devices 140*b* through *n* may have the same components as described in the discussion of this Figure.

In the example embodiment, an administrator of autonomous system 100 may determine a number of logical contexts to create for the system. Based on the number of logical contexts chosen for autonomous system 100, a corresponding number of distributed locks and context key values may be created and stored in server 150. For example, if the administrator of autonomous system 100 creates two logical contexts, two distributed locks and two context key values (corresponding to the distributed locks) may be created and stored in server 150. Furthermore, in the example embodiment, the two distributed locks may be released by server 150 for the BGP managers of each route reflector client device in autonomous system 100 to try and obtain. If a BGP manager is able to obtain one of the two distributed locks, the BGP manager may then provision the corresponding BGP instance to be a route reflector. For example, when autonomous system 100 goes online, in order for BGP 124 to become a route reflector, BGP manager 122 obtains a distributed lock released by server 150, and based on obtaining the distributed lock, BGP manager 122 provisions BGP 124 to be a route reflector for the logical context corresponding to the obtained distributed lock.

Figure 4:
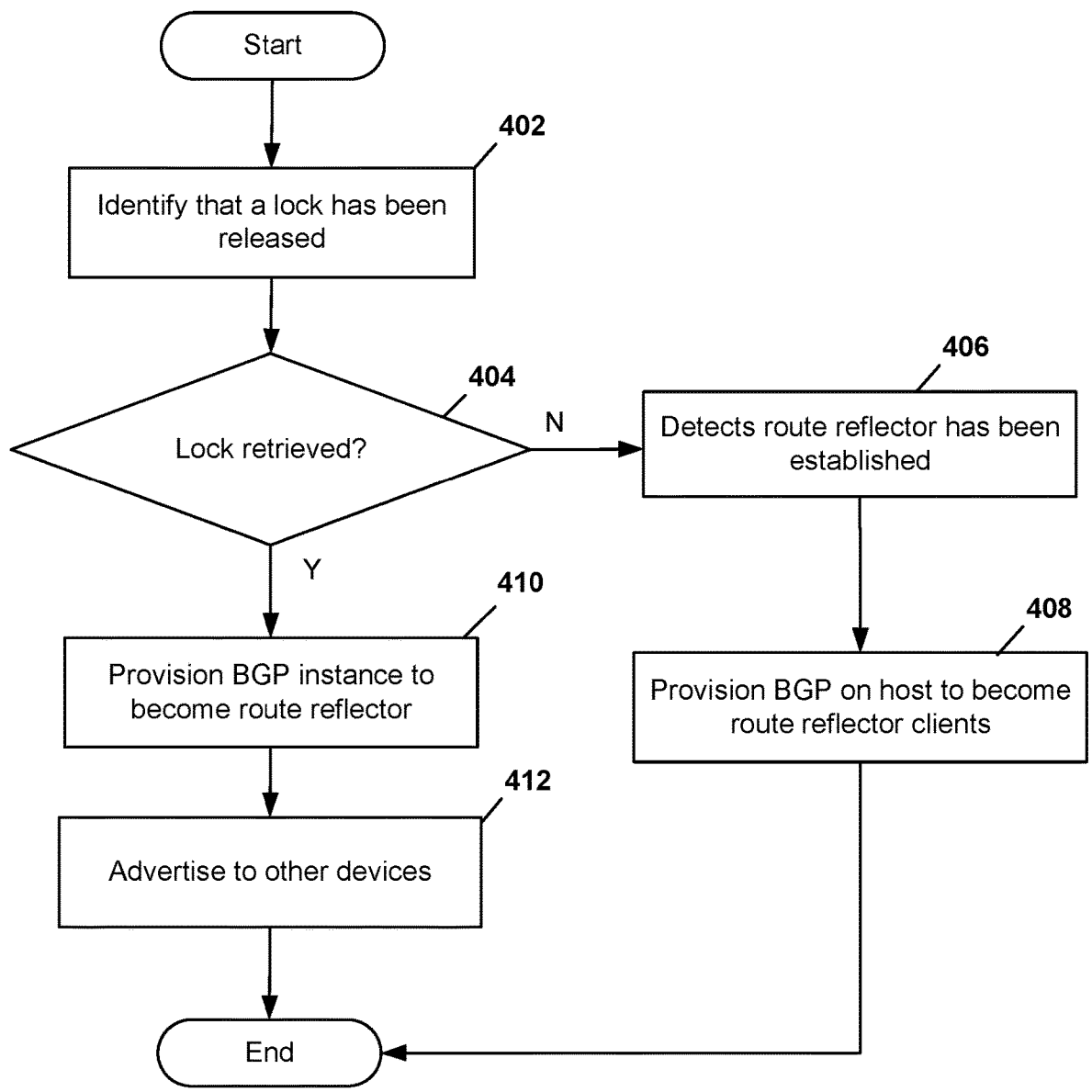
FIG. 4 is a flowchart illustrating the operations of the BGP manager of FIG. 3 in automatically determining whether to provision BGP 142b to be a route reflector, in accordance with an embodiment.

FIG. 4 is a flowchart illustrating the operations of BGP manager 142*a* in automatically determining whether to provision BGP 142*b* to be a route reflector, in accordance with an embodiment. In the example embodiment, the operations described in FIG. 4 may additionally correspond to the operations of the BGP managers located on route reflector client devices 140*b* through *n*.

In the example embodiment, BGP manager 142*a* identifies that a lock has been released by server 150 (step 402). In the example embodiment, each BGP manager that corresponds to a route reflector device, such as BGP manager 122 on route reflector device 120, transmits a context key update to server 150 to confirm that the route reflector is still functioning. However, if after a threshold period of time, lock application 152 does not detect the reception of a context key update message from a BGP manager of a route reflector for a logical context within the subnet (autonomous system 100), lock application 152 may determine that the route reflector is no longer functioning and may then release the distributed lock that corresponds to the logical context. For example, if BGP 124, goes offline, by way of, for example, power failure or an issue with the functionality of route reflector device 120, lock application 152 may not detect the reception of a context key update message from BGP manager 122 for a threshold period of time. Therefore, lock application 152 may determine to release the distributed lock that corresponds to the logical context associated with BGP 124. Furthermore, in the example embodiment, each BGP manager in the subnet, such as BGP manager 142*a*, may put a watch on lock application 152, and therefore, when the distributed lock is released, each BGP manager for each respective device in the subnet is aware and may attempt to obtain it.

While in the example embodiment, each BGP manager (including BGP managers for route reflector devices and route reflector client devices) puts a watch on lock application 152 and attempts to obtain a released distributed lock, in other embodiments, only BGP managers corresponding to route reflector client devices may put a watch on lock application 152 and attempt to obtain a released distributed lock.

BGP manager 142*a* determines if it has retrieved the released distributed lock (decision 404). If BGP manager 142*a* determines that it has retrieved the released distributed lock (decision 404, "YES" branch), BGP manager 142*a* provisions BGP 142*b* to be a route reflector (step 410). BGP manager 142*a* may then advertise to all other devices in autonomous system 100 that BGP 142*b* is the route reflector for the logical context associated with the retrieved distributed lock (step 412). In the example embodiment, BGP manager 142*a* may advertise to all other devices by publishing device information (such as IP address, subnet address, and autonomous system number associated with BGP 142*b*) to a context key in server 150 corresponding to the released distributed lock. Lock application 152 may then perform an update to correlate the context key with the device information of route reflector client device 140*a* (obtained from BGP 142*b*). In the example embodiment, the context key may be created by combining subnet information and the router reflector number to be in the following format "RR/rr-<#>/subnet/<subnet address>". In other embodiments, the context key may be in another format.

In addition, since the BGP managers corresponding to the route reflector client devices within autonomous system 100 (such as route reflector client devices 140*b* through *n*) have a watch on lock application 152 (monitoring for changes), the BGP managers corresponding to the route reflector client devices within autonomous system 100 may become aware of the update to the context key, and based on the update, may determine that a route reflector has been provisioned for the logical context associated with the context key (and the released distributed lock). Therefore, each BGP manager for each corresponding route reflector client device may provision their corresponding BGP application to be a route reflector client for the determined route reflector (i.e., BGP 142*b*).

Furthermore, each BGP manager that has provisioned a corresponding BGP application to be a route reflector client may advertise their corresponding BGP applications as route reflector clients by way of updating a client key in server 150 which, in the example embodiment, may be in the format "subnet/<Subnet IP>/host context". In other embodiments, the client key may be in a different format. BGP manager 142a may put a watch in lock application 152, and upon detecting an update to the client key, BGP manager 142a is able to view the information in server 150 corresponding to the client key to identify the route reflector clients in the subnet (autonomous system 100), and further establishes connections with the identified route reflector clients.

If BGP manager 142a determines that it has not retrieved the released distributed lock (decision 404, "NO" branch), BGP manager 142a detects that another route reflector client has been established as the route reflector by monitoring (putting a watch on) lock application 152 (step 406), and may instruct BGP 142b to peer with the established route reflector as a route reflector client, in the same manner as described above (step 408).

In one or more embodiments, a route reflector manager, such as a BGP manager on route reflector device 130 may, upon release of a distributed lock by server 150, obtain the distributed lock, and therefore, be in a situation where a distributed lock has been obtained for a first logical context by a route reflector device that contains a BGP application that is a route reflector for a second logical context. In these one or more embodiments, the BGP manager may, upon identification that a distributed lock has been obtained for a first logical context with the corresponding BGP application already being a route reflector for a second context, release the distributed lock (and further may not transmit a key update for the key corresponding to the first logical context for a threshold period of time) and may thereby notify lock application 152 that a route reflector still needs to be determined for the first logical context. Upon identifying that a route reflector still needs to be determined for the first logical context, lock application 152 may re-release the distributed lock for the first logical context.

In further embodiments, the BGP manager on route reflector device 130 may provision the corresponding BGP application on route reflector device 130 to be a route reflector for the first logical context, which may create a situation where the BGP application on route reflector device 130 is a route reflector for the first logical context and the second logical context. Upon identification by the BGP manager that the BGP application on route reflector device 130 is a route reflector for multiple contexts, the BGP manager may provision the BGP application on route reflector device 130 to step down as a route reflector for the second logical context so the distributed lock associated with the second logical context can be released by lock application 152 on server 150. The BGP manager may provide notification to lock application 152 that the BGP application on route reflector device 130 is stepping down with regard to the second logical context by releasing the corresponding distributed lock (and not transmitting a key update for the key corresponding to the second logical context for a threshold period of time). In additional embodiments, the BGP manager may provision the BGP application on route reflector device 130 to step down as a route reflector for the first logical context rather than the second logical context.

Figure 5:
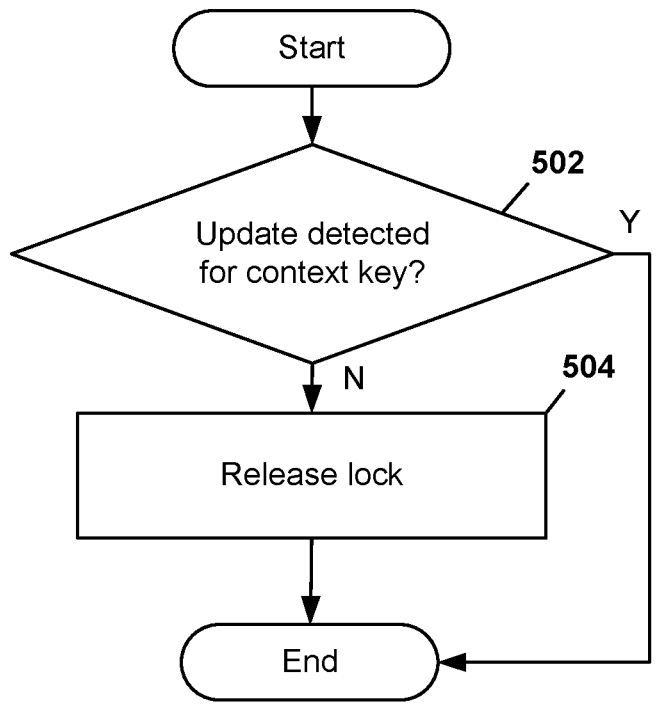
FIG. 5 is a flowchart illustrating the operations of the lock application of FIG. 1 in automatically determining whether to release a distributed lock, in accordance with an embodiment.

FIG. 5 is a flowchart illustrating the operations of lock application 152 on server 150 in automatically determining whether to release a distributed lock, in accordance with an embodiment. In the example embodiment, as stated above, each route reflector transmits a update to a corresponding context key in server 150.

In the example embodiment, lock application 152 determines if an update has been received for each context key within a threshold period of time (decision 502). For example, for a system with two logical contexts, and therefore two context keys, lock application 152 may determine if there has been an update received for each of the two context keys within a respective threshold period of time. If lock application 152 determines that there has been an update received for each of the context keys within the threshold period of time (decision 502, "YES" branch), lock application 152 continues to monitor for updates from each route reflector in autonomous system 100.

If lock application 152 determines that there has not been an update received for at least one context key within the threshold period of time (decision 502, "NO" branch), lock application 152 releases the distributed lock corresponding to the at least context key (step 504).

Figure 6:
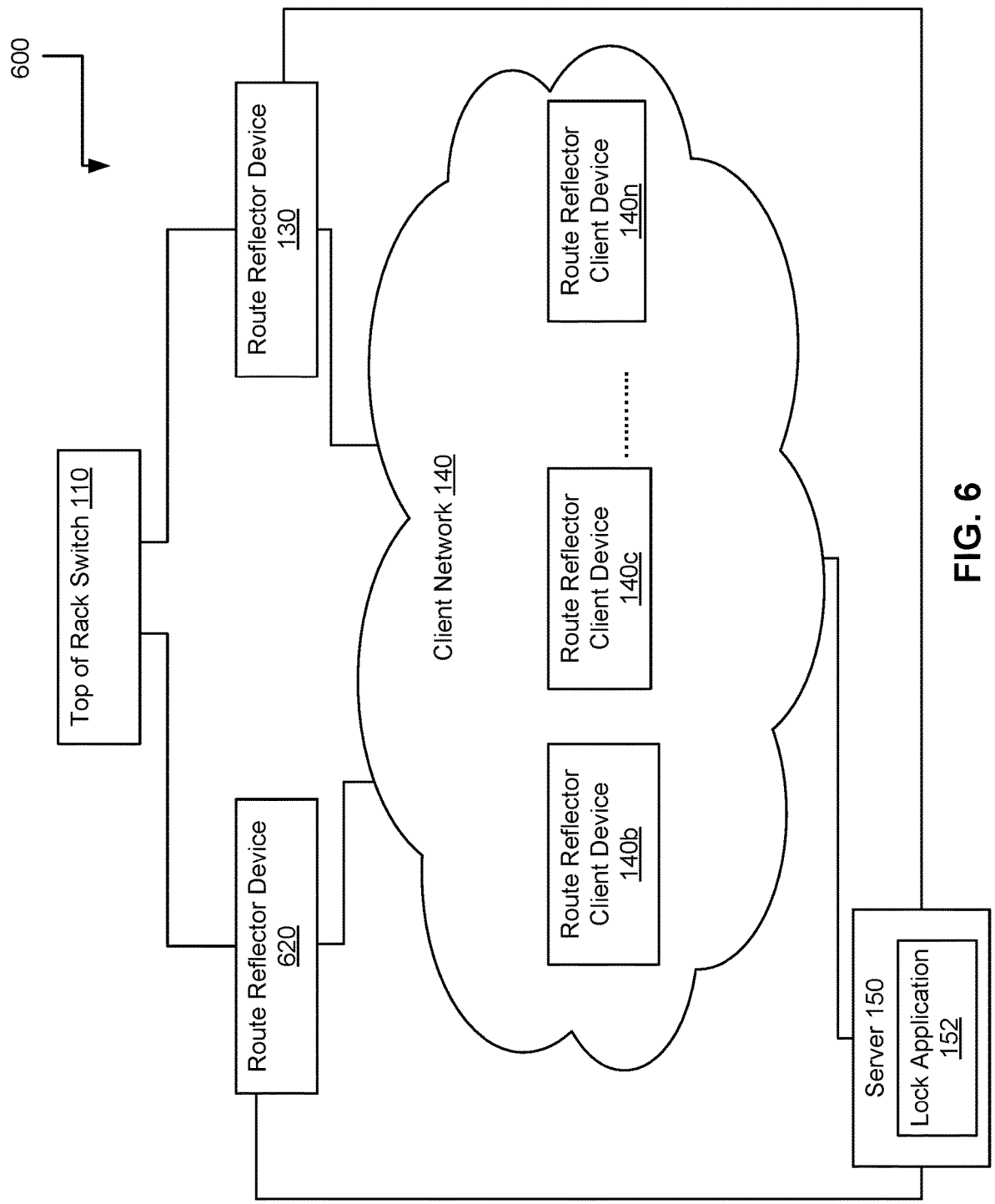
FIG. 6 illustrates an embodiment of the autonomous system of FIG. 1 after a route reflector device has been replaced automatically by a route reflector client device, in accordance with an embodiment.

FIG. 6 illustrates autonomous system 600 which is a depiction of autonomous system 100 after route reflector device 120 has been replaced by route reflector client device 140a (referred to as route reflector device 620 in FIG. 6), in accordance with an embodiment. In the example embodiment, if the route reflector (BGP) application on route reflector device 120 were to go offline, for example due to power failure, the automatic election process described above may allow the autonomous system to automatically elect a new route reflector from among the route reflector client devices, therefore, minimizing forwarding loss. FIG. 6 depicts an autonomous system in which, the BGP application on route reflector client device 140a was automatically elected and provisioned to be a route reflector (depicted as route reflector device 620) and take the place of the route reflector application on route reflector device 120.

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

Figure 7:
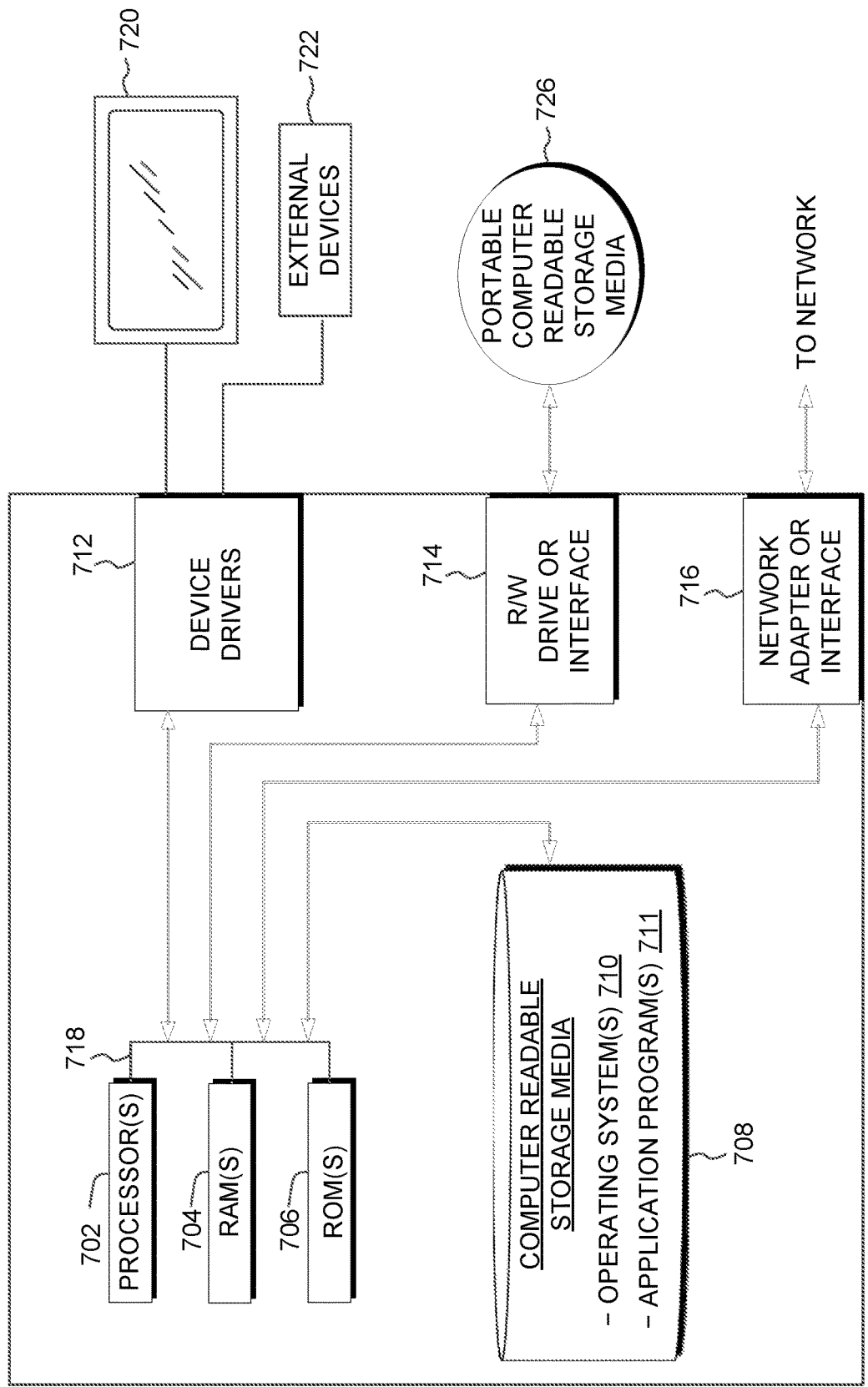
FIG. 7 is a block diagram depicting the hardware components of the autonomous system of FIG. 1 and FIG. 6, in accordance with an embodiment.

FIG. 7 depicts a block diagram of components of one or more computing devices contained in autonomous system 100 and 600 of FIG. 1 and FIG. 6, in accordance with an embodiment. It should be appreciated that FIG. 7 provides only an illustration of one implementation and does not imply any limitations with regard to the environments in which different embodiments may be implemented. Many modifications to the depicted environment may be made.

Computing devices may include one or more processors 702, one or more computer-readable RAMs 704, one or more computer-readable ROMs 706, one or more computer readable storage media 708, device drivers 712, read/write drive or interface 714, network adapter or interface 716, all interconnected over a communications fabric 718. Communications fabric 718 may be implemented with any architecture designed for passing data and/or control information between processors (such as microprocessors, communications and network processors, etc.), system memory, peripheral devices, and any other hardware components within a system.

One or more operating systems 710, and one or more application programs 711, for example, BGP manager 142a, are stored on one or more of the computer readable storage media 708 for execution by one or more of the processors 702 and by utilizing one or more of the respective RAMs 704 (which typically include cache memory). In the illustrated embodiment, each of the computer readable storage media 708 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 714 to read from and write to one or more portable computer readable storage media 726. Application programs 711 on the computing devices may be stored on one or more of the portable computer readable storage media 726, read via the respective R/W drive or interface 714 and loaded into the respective computer readable storage media 708.

Computing devices may also include a network adapter or interface 716, such as a TCP/IP adapter card or wireless communication adapter (such as a 4G wireless communication adapter using OFDMA technology). Application programs 711 on the computing devices may be downloaded to the computing devices from an external computer or external storage device via a network (for example, the Internet, a local area network or other wide area network or wireless network) and network adapter or interface 716. From the network adapter or interface 716, the programs may be loaded onto computer readable storage media 708. The network may comprise copper wires, optical fibers, wireless transmission, routers, firewalls, switches, gateway computers and/or edge servers.

Computing devices may also include a display screen 720, and external devices 722, which may include, for example a keyboard, a computer mouse and/or touchpad. Device drivers 712 interface to display screen 720 for imaging, to external devices 722, and/or to display screen 720 for pressure sensing of alphanumeric character entry and user selections. The device drivers 712, R/W drive or interface 714 and network adapter or interface 716 may comprise hardware and software (stored on computer readable storage media 708 and/or ROM 706).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system, comprising:
    one or more computer-readable memories storing program instructions; and
    one or more processors configured to execute the program instructions to cause the computer system to perform operations comprising:
        identifying, by a first route reflector client manager, that a distributed lock has been released, wherein the first route reflector client manager corresponds to a first route reflector client;
        in response to the identifying that the distributed lock has been released, retrieving, by the first route reflector client manager, the distributed lock;
        in response to retrieving the distributed lock, provisioning, by the first route reflector client manager, the first route reflector client into a first route reflector; and
        advertising, by the first route reflector client manager, information corresponding to the provisioning of the first route reflector client into the first route reflector, wherein the advertising causes at least a second route reflector client to identify the first route reflector client as the first route reflector.

2. The computer system of claim 1, wherein the identifying that the distributed lock has been released includes placing a watch on a server that is storing the distributed lock.

3. The computer system of claim 1, wherein the advertising the information corresponding to the provisioning of the first route reflector client into the first route reflector includes causing device information of the first route reflector client to be associated with a first context key corresponding to the distributed lock.

4. The computer system of claim 3, wherein the device information of the first route reflector client includes an IP address associated with the first route reflector client, a subnet address associated with the first route reflector client, and an autonomous system number associated with the first route reflector client.

5. The computer system of claim 1, wherein the advertising the information corresponding to the provisioning of the first route reflector client into the first route reflector includes causing the second route reflector client to peer with the first route reflector client.

6. The computer system of claim 1, wherein the distributed lock is released by a server in response to the server detecting that an update has not been received for a threshold period of time from an initial route reflector associated with the distributed lock.

7. The computer system of claim 1, the operations further comprising:
    transmitting, by the first route reflector client manager, after provisioning the first route reflector client into the first route reflector, an update to a server corresponding to a context key associated with the distributed lock.

8. A computer system, comprising:
    one or more computer-readable memories storing program instructions; and
    one or more processors configured to execute the program instructions to cause the computer system to perform operations comprising:
        identifying, by a first route reflector client manager, that a distributed lock has been released, wherein the first route reflector client manager corresponds to a first route reflector client;
        in response to the identifying that the distributed lock has been released, performing one or more functions, by the first route reflector client manager, to attempt to retrieve the distributed lock; and
        in response to determining the distributed lock has not been retrieved, causing, by the first route reflector client manager, the first route reflector client to peer with a first route reflector.

9. The computer system of claim 8, wherein the identifying that the distributed lock has been released includes placing a watch on a server that is storing the distributed lock.

10. The computer system of claim 8, wherein the causing the first route reflector client to peer with the first route reflector includes causing device information associated with the first route reflector client to be associated with a client key.

11. The computer system of claim 10, wherein the device information of the first route reflector client includes an IP address associated with the first route reflector client, a subnet address associated with the first route reflector client, and an autonomous system number associated with the first route reflector client.

12. The computer system of claim 8, wherein the distributed lock is released by a server in response to the server detecting that an update has not been received for a threshold period of time from an initial route reflector associated with the distributed lock.

13. A method, comprising:
   identifying, by a first route reflector client manager, that a first distributed lock has been released, wherein the first route reflector client manager corresponds to a first route reflector client;
   in response to the identifying that the first distributed lock has been released, retrieving, by the first route reflector client manager, the first distributed lock;
   in response to retrieving the first distributed lock, provisioning, by the first route reflector client manager, the first route reflector client into a first route reflector; and
   advertising, by the first route reflector client manager, information corresponding to the provisioning of the first route reflector client into the first route reflector, wherein the advertising causes at least a second route reflector client to identify the first route reflector client as the first route reflector.

14. The method of claim 13, wherein the identifying that the first distributed lock has been released includes placing a watch on a server that is storing the first distributed lock.

15. The method of claim 13, wherein the advertising the information corresponding to the provisioning of the first route reflector client into the first route reflector includes causing device information of the first route reflector client to be associated with a first context key corresponding to the first distributed lock.

16. The method of claim 15, wherein the device information of the first route reflector client includes an IP address associated with the first route reflector client, a subnet address associated with the first route reflector client, and an autonomous system number associated with the first route reflector client.

17. The method of claim 13, wherein the first distributed lock is released by a server in response to the server detecting that an update has not been received for a threshold period of time from an initial route reflector associated with the first distributed lock.

18. The method of claim 13, wherein the advertising the information corresponding to the provisioning of the first route reflector client into the first route reflector includes causing the second route reflector client to peer with the first route reflector client.

19. The method of claim 13, further comprising:
   in response to retrieving a second distributed lock, determining, by the first route reflector client manager, that the first route reflector client is a route reflector for a first logical context associated with the first distributed lock and a second logical context associated with the second distributed lock; and
   provisioning, by the first route reflector client manager, to step down as the route reflector for the second logical context.

20. The method of claim 13, further comprising:
   transmitting, by the first route reflector client manager, after provisioning the first route reflector client into the first route reflector, an update to a server corresponding to a context key associated with the first distributed lock.

* * * * *